United States Patent [19]
Kohle et al.

[11] Patent Number: 4,515,489
[45] Date of Patent: May 7, 1985

[54] OVERSTRIKE RIBBON FOR PRINT WHEELS

[75] Inventors: Ulrich Kohle, Burgdorf; Hans Paffhausen, Hanover, both of Fed. Rep. of Germany

[73] Assignee: Pelikan Aktiengesellschaft, Hanover, Fed. Rep. of Germany

[21] Appl. No.: 391,871

[22] Filed: Jun. 24, 1982

[30] Foreign Application Priority Data

Jun. 27, 1981 [DE] Fed. Rep. of Germany ....... 3125782
Apr. 19, 1982 [DE] Fed. Rep. of Germany ....... 3214305

[51] Int. Cl.$^3$ .............................................. B41J 31/02
[52] U.S. Cl. .............................. 400/241.2; 428/321.3; 428/914
[58] Field of Search ..................... 400/120, 227, 240.1, 400/241.1, 241.2; 427/152, 256; 428/914, 321.1, 321.3, 321.5, 323, 320.4; 252/8.8, 355, 357; 156/79, 204

[56] References Cited

U.S. PATENT DOCUMENTS

| | | | |
|---|---|---|---|
| 2,644,759 | 7/1953 | Schroeder | 252/357 X |
| 2,809,159 | 10/1957 | Welles et al. | 252/8.8 |
| 2,984,582 | 5/1961 | Newman et al. | 428/914 X |
| 3,049,457 | 8/1962 | Peshin et al. | 428/914 X |
| 3,060,182 | 10/1962 | Zech | 252/357 X |
| 3,080,954 | 3/1963 | Newman et al. | 400/241.2 |
| 3,287,153 | 11/1966 | Schwarz et al. | 400/241.2 X |
| 3,348,651 | 10/1967 | Mater et al. | 400/241.2 |
| 3,392,042 | 7/1968 | Findlay et al. | 400/241.2 X |
| 3,413,183 | 11/1968 | Findlay et al. | 428/914 X |
| 3,682,683 | 8/1972 | Elbert et al. | 428/321.3 X |
| 3,689,301 | 9/1972 | Scott | 428/914 X |
| 3,864,181 | 2/1975 | Wolinski et al. | 156/204 X |
| 3,930,099 | 12/1975 | Gregson | 400/241.2 X |
| 3,942,621 | 3/1976 | Karlan | 400/240.1 X |
| 4,066,585 | 1/1978 | Schepp et al. | 427/256 X |
| 4,150,187 | 4/1979 | Brown | 427/152 X |
| 4,308,318 | 12/1981 | Weiche | 400/120 |
| 4,321,286 | 3/1982 | Scott et al. | 428/914 X |
| 4,427,739 | 1/1984 | Kohle et al. | 428/323 |

FOREIGN PATENT DOCUMENTS

| | | |
|---|---|---|
| 1411160 | 11/1968 | Fed. Rep. of Germany . |
| 2411104 | 3/1974 | Fed. Rep. of Germany . |
| 2815344 | 4/1978 | Fed. Rep. of Germany . |
| 2823382 | 10/1979 | Fed. Rep. of Germany . |
| 2021920 | 10/1969 | France . |
| 421151 | 3/1967 | Switzerland . |
| 958081 | 5/1964 | United Kingdom . |
| 1000682 | 8/1965 | United Kingdom . |
| 1028618 | 5/1966 | United Kingdom . |
| 2010515 | 8/1978 | United Kingdom . |

Primary Examiner—Ernest T. Wright, Jr.
Attorney, Agent, or Firm—Karl F. Ross; Herbert Dubno

[57] ABSTRACT

A multiple overstrike carbon ribbon utilizes a low-viscosity oil base in the form of mineral oil with 25 to 50% of aromatics and nevertheless does not permit the transferred color to bleed on the substrate. The ribbon is particularly useful for daisy wheel and like high-velocity printers.

5 Claims, 1 Drawing Figure

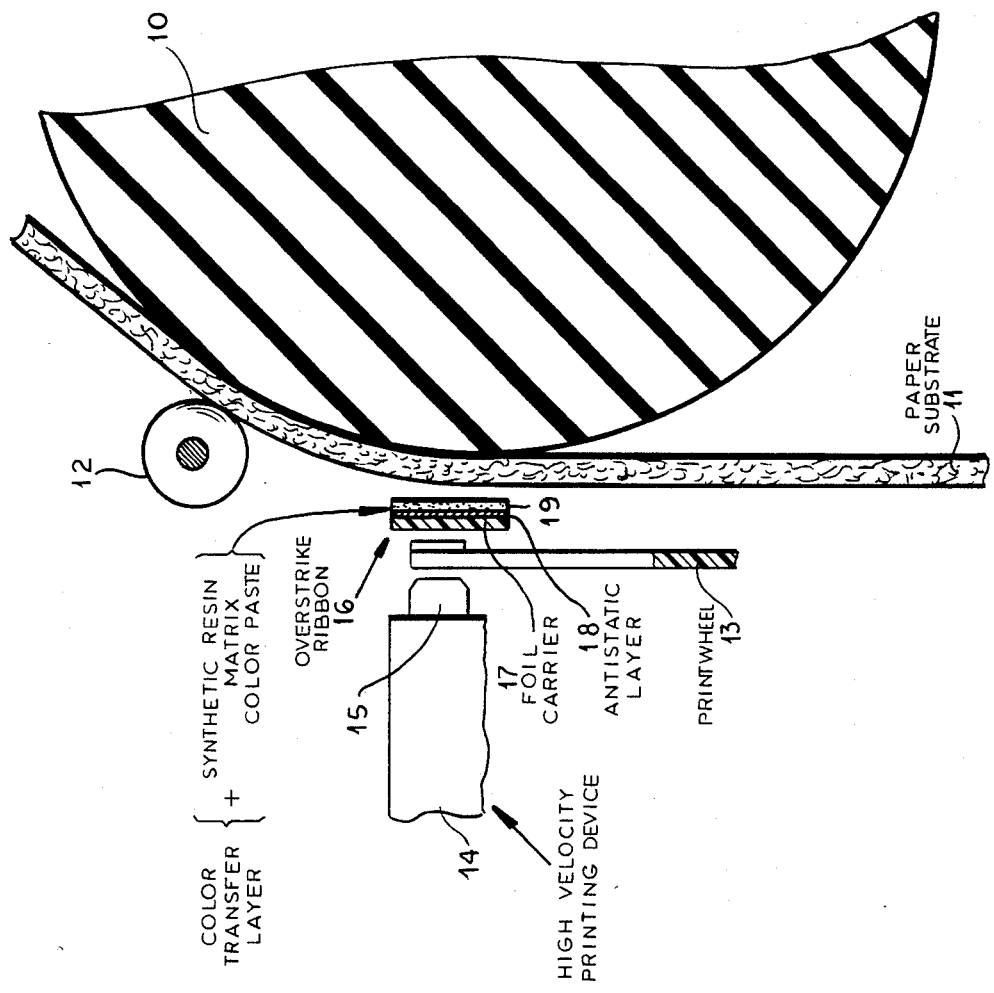

OVERSTRIKE RIBBON FOR PRINT WHEELS

CROSS REFERENCE TO RELATED APPLICATION

This application is related to the commonly assigned copending application Ser. No. 374,037, filed May 3, 1982 naming us together with Claus Hartmann as joint inventors (now U.S. Pat. No. 4,427,739 issued Jan. 24, 1984).

FIELD OF THE INVENTION

The present invention relates to a typewriter or printer ribbon with overstrike capability, and more particularly to a type or print transfer ribbon specifically for use with high velocity printing devices, namely print wheels.

BACKGROUND OF THE INVENTION

Character-transfer ribbons can be used on typewriters and printers, e.g. for word-processing machinery or computers, utilizing a variety of devices for transferring an image of a character to a substrate, e.g. a sheet of paper, displaced on a platen, the substrate being interposed between the platen and the ribbon.

The mechanism utilized to transfer color from the ribbon to the substrate can include relatively low velocity devices such as levers which are provided with typefaces at free ends thereof, and type balls or drums which are rotated and angularly or axially shifted to dispose a selected typeface of a font thereof formed on the ball, in the striking position, the ball being then impelled against the ribbon to impact the latter against the substrate.

High velocity character-transfer devices are commonly in use in typewriters and printers for independent use or for use as part of computers, word processing equipment or electronic data output terminals.

Such print wheels (daisy wheels) generally comprise a multiplicity of radially extending deflectable arms formed at their free ends with the respective character or typeface, and provided with a common hub by which the wheel is mounted for rapid angular displacement on the wheel carrier of the machine. A hammer aligned with the free end of the arms as they are moved into the strike position is capable of imparting an impact to the respective free ends to drive the latter against the ribbon and the substrate. Such systems are of the high velocity type, i.e. the velocity with which the typeface is carried towards and resiliently withdrawn from the substrate is substantially greater than the velocity with which the typefaces are moved toward and away from the substrate with lever-type and ball-type systems.

The most common ribbon utilized in the past generation for typewriters and the like was the inked cloth ribbon, which consists generally of a woven band impregnated with ink and from which ink in the pattern of the typeface is carried onto the substrate to produce the image or the type pattern thereon. Such ribbons or cartridges or reels usually are moved back and forth past the striking position numerous times until their image-producing capacities fade, whereupon the ribbons are discarded and replaced. For this purpose the machine is equipped generally with a reversing mechanism which is effective upon each passage of the full length of ribbon to switch the direction of ribbon track.

In more recent years, a large part of the ribbon market has been taken over by so-called single-use carbon ribbon, a ribbon which consists of a synthetic resin foil carrier and a pigmented layer which is transferred to the substrate upon impact of the typeface with the back of the ribbon.

Such ribbons are comparatively expensive because they can be used only once.

It has already been proposed to provide an overlapping-impact ribbon, i.e. a ribbon in which each impact of the typeface is executed partly on fresh ribbon and partly on ribbon which has been subjected to a previous color-transfer impact. Such ribbons are also called overstrike ribbons since a portion of each typing strike is effected over regions which have been previously struck. Overstrike ribbons are provided mainly for type wheel printers. In operation, for example, the ribbon may be advanced by, say $\frac{1}{3}$ of the character width with each character strike, so that the next strike will take place over a region corresponding to $\frac{1}{3}$ of the width and constituted by fresh ribbon which has not previously transferred color to the substrate. The other $\frac{2}{3}$ of the strike will be effected over previously struck ribbon.

Consequently, only part of each typing impact is effected on fresh ribbon, while the larger proportion of each impact is effected on previously impacted portions which themselves have received two or more impacts.

In the case of a $\frac{1}{3}$ displacement in the manner described, each area of the ribbon position at the striking location receives the equivalent of 3.3 impacts and thus the entire ribbon is effectively used 3.3 times, i.e. is a 3.3 overstrike ribbon.

The advantage of this arrangement is that the ribbon becomes a multiuse ribbon in spite of the fact that it is only moved substantially unidirectionally through the typing station and does not have to be reversed. In fact, a typewriter or printer equipped with an overstrike ribbon which allows three or more strikes at each location can eliminate the ribbon return mechanism entirely, since the ribbon can be discarded economically after only a single pass.

Unfortunately, overstrike ribbons as, for example, described in German open application No. 28 23 382, comprise a thin support foil and a color-transfer coating in the form of a synthetic resin binder matrix and a coloring paste dispersed in this matrix.

The coloring paste itself consists essentially of a coloring agent or pigment, a wetting agent and fillers, all in an oil base which is immiscible with the synthetic resin of the matrix.

The oil base generally is a thioxotropic high viscosity mixture (viscosity of at least 100,000 mPa.s at 20° C.) of liquid oils such as ricinus, neat's foot oil, peanut oil, glycerintrioleate, or mineral oil, and semisolid waxes such as lanolin, petrolatum etc.

To form the color-transfer coating, a solution of the binder in the solvent, which can also solubilize the oil base, is formed and applied to the carrier foil. The solvent-borne coating is then dried by vaporization of the solvent and the oil-phase is dispersed in numerous microdroplets within the binder. These droplets, which ideally intercommunicate with one another, are embedded in the binder when the latter hardens or sets.

The result is a spongy synthetic resin matrix upon a carrier foil, which is filled with the coloring paste and from which a portion of the coloring paste can be pressed (extruded) onto the substate with each strike of the typeface.

Conventional overstrike ribbons of this type have a 3.3 overstrike capacity and efforts to extend their use to a 5-fold overstrike capacity, i.e. a system in which the advance of the ribbon is reduced to 1/5 the character width for each stroke, have not been successful, since portions of the character are not effectively printed.

This is especially the case for high-velocity impact printing machines utilizing print wheels as described above.

By comparison with print balls and lever-borne typefaces which operate at a comparatively low velocity so that there is time for the coloring paste to be extruded from the binder matrix onto the substrate, high-velocity impact printing appears to bring a ribbon into contact with the paper and the typeface for too short a period to permit effective transfer.

The obvious solution, namely, a reduction in the viscosity of the coloring paste, has not succeeded in solving the problems with such ribbons.

For one thing, reduced viscosity is generally brought about by the addition of liquid oil, which dilutes the coloring matter and makes the imparted coloration somewhat pale. When attempts are made to compensate for the reduction of the viscosity by addition of oil-soluble coloring matter, the highly colored thin oil base tends to bleed readily in the fibrous paper of the substrate and to distort the image by widening the latter and rendering it duffuse and less sharp than is desired. Furthermore, the more fluid "ink" tends to penetrate the paper readily and the image can show through on the reverse side.

Another disadvantage with the low viscosity paste is the less effective coating which can be carried out because phase-separation from the binder appears to occur before the solvent has sufficiently vaporized to ensure an effective dispersion of the coloring material within the binder matrix.

Finally, when the coloring material is too thin, i.e. is of reduced viscosity, during the initial strike excessive coloring matter is transferred to the substrate so that insufficient coloring matter may remain for effective subsequent strikes. The transferred print is thus nonuniform and the problem which reducing the viscosity attempted to solve is recreated.

OBJECTS OF THE INVENTION

It is the principal object of the present invention to provide an overstrike ribbon, particularly for use with a daisy wheel and other printing wheel printers or typewriters, whereby disadvantages of earlier overstrike ribbons are obviated.

Another object of this invention is to provide an overstrike ribbon capable of a 5-fold overstrike capacity or more, which transfers uniform character reproductions to a substrate without loss of sharpness and with deep coloration, e.g. dark black, even for type wheel printers operating at high velocities.

Still another object of this invention is to provide a method of making a ribbon of this improved quality.

DESCRIPTION OF THE INVENTION

These objects and others which will become apparent hereinafter are attained, in accordance with the present invention, in an overstrike ribbon with multiple overstrike capacity, i.e. at least 5-fold overstrike capacity, which comprises a synthetic resin carrier foil provided on a surface adapted to confront a paper substrate with a color-transfer layer, the color-transfer layer consisting of a synthetic resin binder matrix and, dispersed in this matrix, interconnecting droplets of an oil-base coloring matter or paste which can be partly extruded by impact of a typeface thereagainst onto the substrate, the oil-base coloring matter consisting essentially of at least one oil-dispersible coloring agent or pigment, at least one filler and at least one wetting agent.

According to the invention, the oil vehicle or base consists of a mineral oil, which in turn consists of 25 to 50% by weight (preferably 25 to 40%) aromatic hydrocarbons and carbon atoms connected with saturated linkages or bonds, 30 to 40% of such carbon atoms being present in cycloaliphatic groups, the wetting agent being selected from the group of fatty amine salts and the filler consisting of a finely divided solid capable of absorbing the oil phase and pigment and thus having a high internal surface area. The viscosity of the coloring paste is brought to a value of 4,000–10,000 mPa.s (20° C.).

The present invention attacks the problem discussed above by providing a low-viscosity coloring paste, which, however, does not reduce the viscosity at the expense of the strength of transferred color or by an expedient that permits bleeding of the transferred color or penetration of the transferred color through the substrate. In the present invention, which also allows effective coating of the transfer layer onto the foil, and which does not permit more of the paste to be transferred to the substrate in the first strike than in the subsequent strikes, the combination of the oil, wetting agents and fillers appears to guarantee retention of the pigment in the coloring paste within the spongy synthetic resin layer so that this color paste is not excessively driven out of the binder and retains its ability to produce sharp uniform color images for a multiplicity of strikes.

While we are not certain of the mechanism for this improved result in spite of the reduction in the viscosity of the coloring paste, we believe that an important factor may be the interplay of various surface active phenomena within the color transfer layer.

We have found that the very specific mineral oil of the invention which consists preferably of 25 to 40% by weight aromatic hydrocarbons and in which 30 to 40% of the carbon atoms with saturated bonds are naphthenically bonded, has a greater capability for pigmentation uptake than previously used oil bases or about the same pigment uptake in spite of the fact that the resulting pasty mixture has a substantially lower viscosity, and at the same time produces an extremely effective foam-layer in combination with the synthetic resin binder. As a result, the low-viscosity color paste has a high-color density and all of the advantageous properties of the color paste used heretofore, but with a lower viscosity which permits more rapid transfer of color to the substrate, thereby improving the strike quality. Comparative tests have shown that aromatic contents in the mineral oil outside the recited limits, for example, results in a sharp diminution in the quality.

Another surprising feature of the invention is that in spite of the reduced viscosity, the color which is transferred per impact is more uniformly distributed over a succession of impacts, i.e. at least 5, so that printing quality does not diminish because the overstrike capacity is increased to 5-fold.

It should be noted that an important contribution appears to be made by the filler of the invention, which has a high internal surface area, because the substitution of fillers which are not capable of absorbing the oil or the pigment results in a drastic limitation in the overstrike capacity as well as an overall reduction in the quality of the transferred images.

The present invention utilizes finely divided fillers which are highly effective as absorbents, such as diatomaceous earth or precipitated silica, active charcoal or broken microshperes, or other materials having an internal surface which can be penetrated by the coloring paste and which also provides a high internal porosity.

Low absorbency materials such as China glaze, calcium sulfate and titanium dioxide, utilized principally as fillers heretofore, and thus replaced by more internally permeable materials.

The new fillers, as noted, contribute significantly to the uniformity of the delivery of coloring matter in successive impressions or strikeovers.

We have found that the use of the fatty amine salt wetting agent is highly important to the present invention. When it is replaced by other wetting agents, even more potent ones, the quality of the typewritten image appears to suffer. Apparently, the fatty amine salts serving as wetting agents according to the invention have the dual function of fluidizing the color paste within the pores of the filler so that it can be effectively transferred and also facilitating penetration of the color paste into pores so that it can be stored.

When we refer to fatty amine salts herein we intend to include thereby salts of long chain natural or synthetic fatty acids and mainly the primary alkyl amines formed with long chain or short chain fatty acids and even inorganic acids such as hydrochloric acis. Typical examples of fatty amine salts which may be used according to the invention include tallow fatty amino oleate, coconut fatty amine acetate and stearyl amine stearate. The preferred fatty amine salts are thus of propylene diamines of the formula $R-NH-(CH_2)_3-HN_2$ where R is a fatty acid residue, i.e. is an alkyl straight or branched chain having at least 6 and up to 24 carbon atoms, or is $C_6-C_{24}$ alkylene having 1, 2 or 3 unsaturated linkages per molecule.

It should be apparent from the foregoing that the invention requires a combination of features, one of which is the specific oil, another the character of the filler and a third the nature of the wetting agent utilized and that all of these contribute to the unique result which makes the coloring paste extremely flowable yet capable of holding a large proportion of coloring matter or pigment and yielding this material in a comparatively large number of strikes. It is this which permits the low viscosity paste to transfer color with high definition and with a high overstrike capacity.

The preferred proportions are the following:
synthetic resin binder (in solid form): 8 to 12% by weight, preferably 9 to 11% by weight;
mineral oil with 25 to 50% (preferably 25 to 40%) aromatics and otherwise constituted according to the invention as described: 10 to 18% by weight, preferably 12 to 16% by weight;
pigment (preferably carbon black or a material which contains carbon black): 5 to 10% by weight, preferably 7 to 9% by weight;
fatty amine salts: 1 to 5% by weight, preferably 2 to 4% by weight; and
filler: 5 to 10% by weight, preferably 6 to 8% by weight, particle size range 0.2 to $20\mu$ (preferably 0.2 to $10\mu$)

All of the foregoing components have been given in percentages by weight of a composition which can be coated upon a conventional carrier foil for carbon ribbons, the balance of the composition being a solvent which can, in total, make up 40 to 70% by weight, preferably 50 to 60% by weight.

Since the solvent evaporates once the coating is formed, the aforedescribed composition apart from the solvent and in parts by weight (as distinct from percentages) can be considered to make up the actual color-transfer coating.

The synthetic resin binders which can be used according to the invention are any of the binders which have been used heretofore for color-transfer coatings for typewriters or printer ribbons, for example, polyacrylates, polyvinylchloride-acetate mixed or copolymers, linear polyesters, polyvinylacetates and polystyrenes.

The solvents which can be used can be any which have gained prominence in the application of such color-transfer layers to carbon ribbon supports, namely, methylethylketone, toluene, isopropylalcohol and the like and mixtures thereof.

The solvents can be introduced in whole or in part as a vehicle for other ingredients.

To produce the ribbon according to the invention, the mixture as described above is coated upon the carrier foil, which can be composed of polyester, polyethylene, polypropylene, polyamide, or the like and dried.

The total thickness of the completed ribbon should not exceed 26 microns in the interest of maximizing the ribbon length which can be stored in a cassette of standard dimensions. In general, the foil should be as thin as possible consistent with the overstrike needs and a preferred thickness of 8 microns may be used.

Adhesion-forming and antistatic intermediate layers can be employed with a thickness of about 1.5 microns as described in German open application 28 15 344. As a result, the color-transfer coating thickness can be about 16 microns. Some of the filler particles may have a particle size greater than 16 microns and may project from the surface of the coating. This does not appear to adversely affect the quality of the printing.

SPECIFIC EXAMPLE

A color transfer coating is formed by mixing:
9.5% by weight of polyvinylchloride-acetate mixed polymers;
15.1% by weight mineral oil containing 33% by weight aromatics;
7.6% by weight carbon black to which conventional color improving adhesive may be admixed;
2.1% tallow propylene diamine oleate;
7.3% by weight diatomaceous earth (particle size $0.8\mu$ average);
18.0% by weight toluene; and
40.4% by weight methyl ethyl ketone.

The mineral oil which is used is marketed by Shell Oil Co. under the name Flavex oil #937 and has the following statistical carbon distribution:
8% of the carbon atoms are aromatically bound;
34% of the carbon atoms are cycloaliphatically bound;
57% of the carbon atoms are aliphatically bound; and
38% of the standard carbon bonds are of a cycloaliphatic nature, i.e. correspond to those of paraffin in base oil which is relatively highly naphthenic.

The statistical ranges for the mineral oil of the invention are the following:

9 to 15% aromatically bonded carbon atoms;
25 to 35% cycloaliphatically bonded carbon atoms; and
55 to 65% aliphatically bonded carbon atoms.

The mixture is applied to a polyester foil having a thickness of 8 microns after a 1.5 micron layer of the adhesion-forming antistatic material described in the German application 28 15 344. The color-transfer coating after drying had a thickness of 16 microns. The resulting ribbon had a 5-fold overstrike capacity, i.e. could be advanced at 1/5 of the standard character width between a daisy-type wheel and the copy paper, and produced completely uniform, sharply defined characters of high-color depth. The color did not tend to bleed on the paper or penetrate the latter.

BRIEF DESCRIPTION OF THE DRAWING

The above and other objects, features and advantages of the present invention will become more readily apparent from the following description, reference being made to the sole FIGURE of the accompanying drawing which represents a diagrammatic cross section illustrating the use of the ribbon of the invention.

SPECIFIC DESCRIPTION

In the drawing, we have shown highly diagrammatically the high velocity printing head 14 with a hammer 15 adapted to strike a printwheel 13 which as a character locked at the printing position against an overstrike ribbon 16 in accordance with the invention, to transfer the imprint to a substrate 11 which can be a sheet of paper guided along a platen 10 and held thereagainst by a roller 12.

As has been described, the ribbon 16 can have a foil carrier 17 and a color transfer layer 19 while an antistatic layer 18 can be disposed between the color transfer layer 19 and the foil carrier 17. The color transfer layer 19 may include the synthetic resin matrix and color paste compositions described previously.

We claim:

1. An overstrike ribbon capable of being advance with each printing of a letter between a high velocity printing device and a substrate through a fraction of the character width, said ribbon comprising:
   a synthetic-resin foil carrier; and
   a color-transfer layer on said carrier and bonded thereto, said color transfer layer comprising:
      a synthetic-resin matrix; and
      a color paste dispersed in said matrix, said color paste comprising:
         an oil vehicle consisting of a mineral oil containing 25–50% by weight of aromatic-hydrocarbons and 30–40% of the saturated bonded carbon atoms being cycloaliphatically bonded;
         a coloring pigment distributed in said vehicle;
         a cationic wetting agent in the form of at least one fatty amine sale of a fatty propylene diamine of the formula $R-NH-(CH_2)_3-NH_2$, where R is a long-chain fatty acid residue; and
         a finely divided solid filler with a high specific surface area and a particle size distribution of 0.2 to 20 microns.

2. The ribbon defined in claim 1 wherein said filler is selected from the group which consists of diatomaceous earth, precipated silica, active carbon and broken, hollow microspheres and mixtures thereof.

3. The ribbon defined in claim 1 wherein said matrix is present in said layer in an amount of 8 to 12 parts by weight, said mineral oil contains 25 to 40% aromatics and is present in an amount of 10 to 18 parts by weight, said pigment is present in an amount of 5 to 10 parts by weight, said fatty amine salt is present in an amount of 1 to 5 parts by weight, and said filler is present in an amount of 5 to 10 parts by weight.

4. A method of making a multiple overstrike ribbon particularly for use with print wheels, which comprises:
   dispersing 8 to 12% by weight of a matrix-forming synthetic resin, 10 to 18% by weight of a mineral oil containing 25 to 50% aromatic hydrocarbons, 5 to 10% by weight of a carbon black containing pigment, 1 to 5% by weight of a cationic wetting agent in the form of a fatty amine salt of a fatty propylene diamine in the formula $R-NH-(CH_2)_3-NH_2$, where R is a long chain fatty acid residue, 5 to 10% by weight of a filler having high surface absorbent activity and in a particle size of 0.2 to 20 microns, in 40 to 60% by weight of a vaporizable solvent to form a coating composition;
   applying said composition to a specific synthetic resin carrier foil; and
   evaporating said solvent to dryness whereby a color-transfer layer is formed on said foil.

5. The method defined in claim 4 wherein said color-transfer layer has a thickness of about 16 microns and is applied to said foil after application of a bond-promoting antistatic layer in a thickness of 1.5 microns thereto.

* * * * *